Figure 1:
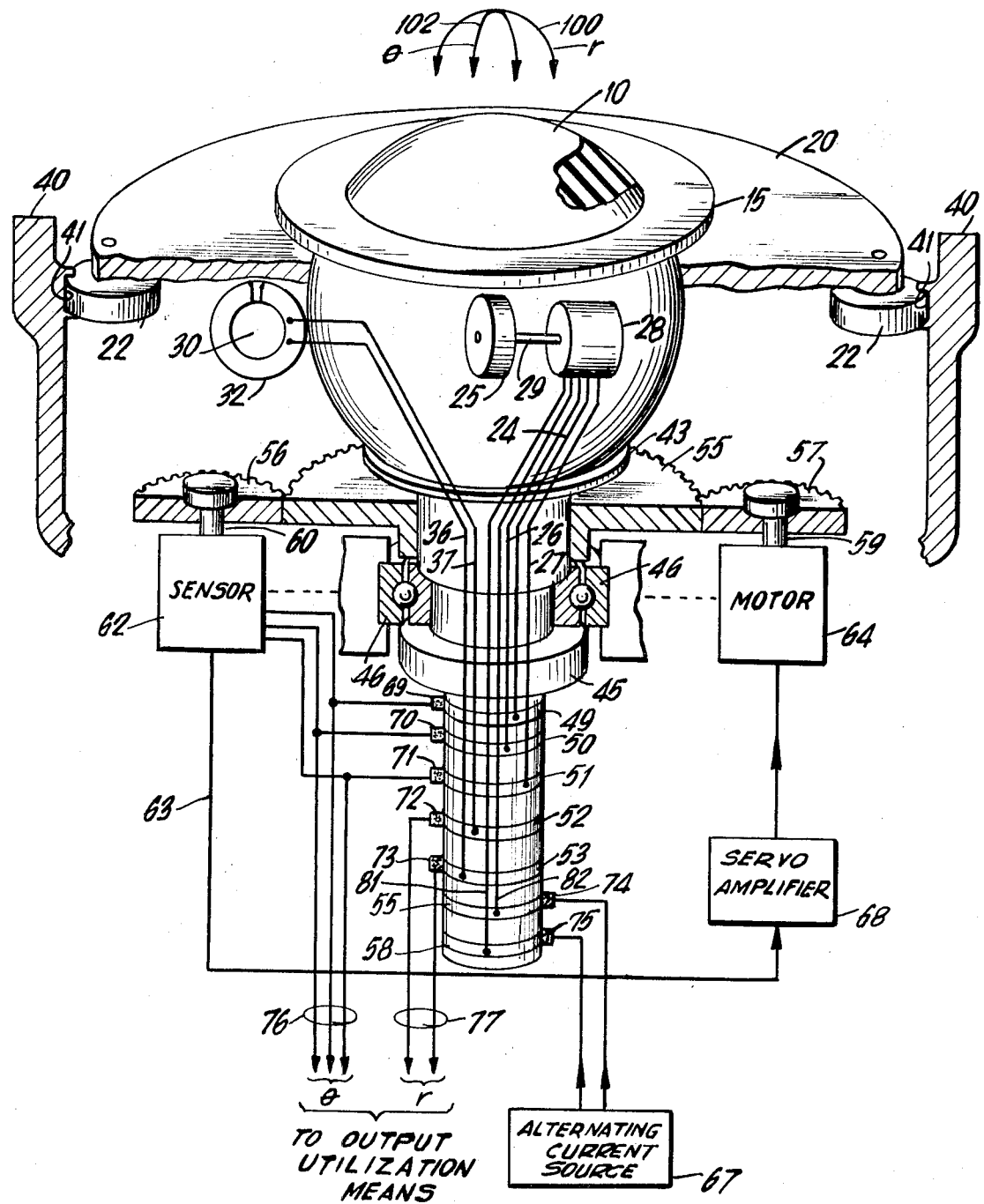

United States Patent
Brown et al.

[15] 3,643,148
[45] Feb. 15, 1972

[54] BALL TRACKER ASSEMBLY

[72] Inventors: Arthur Brown, Bayside; Thomas W. Wong, New Hyde Park, both of N.Y.

[73] Assignee: Edo Corporation, College Point, N.Y.

[22] Filed: Apr. 16, 1970

[21] Appl. No.: 29,144

[52] U.S. Cl. ..................................318/628, 244/83, 74/471
[51] Int. Cl. ......................................................G05b 11/01
[58] Field of Search ................318/628, 83; 244/83 B, 83.91; 74/471

[56] References Cited

UNITED STATES PATENTS

| | | | |
|---|---|---|---|
| 3,028,126 | 4/1962 | Holleman | 318/628 X |
| 3,395,589 | 8/1968 | Gersten | 74/471 |
| 2,762,234 | 9/1956 | Dodd | 74/471 |
| 3,013,441 | 12/1961 | Alexander | 74/471 |
| 3,269,190 | 8/1966 | Laman | 74/471 |

*Primary Examiner*—Benjamin Dobeck
*Attorney*—Davis, Hoxie, Faithful & Hapgood

[57] ABSTRACT

A ball tracker adapted for use in polar coordinate axis systems employs a rotating subframe including a rotatably mounted ball member and two ball rotation responsive sensors disposed 90° apart along the median ball circumference. The electronic output of the two sensors comprises polar coordinate range ($r$) and angle ($\theta$) parameters, and feedback apparatus maintains the range sensor spatially aligned in an angular direction determined by the output of the angle sensor.

A controlled environment ordered in polar coordinates, e.g., a cursor position in a polar cathode-ray tube display, may be regulated by actuating the ball tracker in a manner which is conceptually compatible with the natural predictions of a tracker operator.

8 Claims, 2 Drawing Figures

FIG. I

BALL TRACKER ASSEMBLY

This invention relates to electronic signal generating apparatus and, more specifically, to a ball tracker assembly particularly amenable for use in polar coordinate systems.

Various transducer instruments have been employed to provide two variable output electrical signals for control or other applications. Thus, for example, one signal may be employed to control the forward-rear speed or position of a vehicle, machine, tool or the like, while the second signal controls the left-right lateral speed or position; or one signal may control the vertical position of a spot in a cathode ray tube display while the other signal controls the horizontal position.

In its simplest form, such a transducer instrument may comprise two separate devices (potentiometers, analog or digital shaft encoders or the like) each of which independently provides one of the two requisite output signals. An operator can then independently adjust the two transducer components to specify vehicle speed in any direction; position the display spot anywhere on a cathode-ray tube display; or provide orthogonal signals for any other environment or application.

However, separate transducer components require the use of both hands of an operator who is therefore unable to perform any other ancillary functions. Accordingly, various apparatus has been employed to allow an operator to generate and control both signals with a single instrumentality. In typical embodiments, each signal is independently controllable by moving the instrumentality in associated particular directions, and both signals are simultaneously varied by any motion intermediate these particular directions.

One form of integral signal-generating transducer is a ball tracker as disclosed, for example, in W. F. Alexander U.S. Pat. No. 3,013,441, issued Dec. 19, 1961, G. M. Laman U.S. Pat. No. 3,269,190, issued Aug. 30, 1966 or M. Gersten U.S. Pat. No. 3,395,589, issued Aug. 6, 1968. The ball tracker includes a ball member secured for rotation on a housing, and two potentiometers are operatively disposed about the median circumference of the ball. The potentiometers (or at least potentiometer driving coupling elements) are spaced 90° apart.

When the ball is rotated about one of two specific orthogonal axes, as by the palm of an operator, only an associated one of the two potentiometers is varied thus providing independent adjustment for the two output signals (manifested by the potentiometer resistance values). By rotating the ball about any other axis, both signals change simultaneously.

It will be appreciated that the above-described ball tracker along with other prior art tracker arrangements are well suited for use in two dimensional systems where space (e.g., the plane of motion of a vehicle of the face of a display tube) is measured or controlled in a cartesian x-y coordinate axis reference system. Ball rotation about either special axis will vary the x or y parameter without disturbing the other, while rotation about any other axis will produce linear variations in both the x-y values.

These prior art devices are thus ill suited to control the position of a line or spot (such as a marker, or cursor) in a polar CRT display. There is no intuitive conceptual relationship between the cartesian output of the tracker and the polar response of the display. Thus, in a sonar-radar display for navigational, military or exploration applications where polar coordinate systems are typically used by the nature of the sonar detection scanning operation, an inefficient trial and error process is required to move the cursor to the displayed position of a return signal with the use of a ball tracker. That is, the ball is rotated in a somewhat likely direction, possibly improving one coordinate (range or azimuth) while miscorrecting the other. Continuous adjustments are made to "home-in" on the desired end position by a trial and error readjustment process for the actuating ball.

The position of the cursor—more directly, the electronic signals which define the cursor position—ofttimes supplies "target" (echo return) location information to a tracking computer for navigation, fire control or the like. Valuable computing time is consumed to update stored information and decisionmaking or control programs while the cursor position is being varied. Accordingly, it is desirable to provide rapid, efficient and convenient correction or readjustment in cursor position. To this end, complex electronic circuits have heretofore been employed to provide an automatic interface between the cartesian tracker and the polar display. Such circuits, in addition to their inherent expense, physical volume and associated complexities, are limited regarding achievable accuracy and often introduce computational inaccuracies into the system.

It is thus an object of the present invention to provide improved tracking control apparatus.

More specifically, an object of the present invention is the provision of ball tracker apparatus readily adapted for employment in polar coordinate axis systems.

Another object of the present invention is the provision of a ball tracker directly operable in conjunction with a polar coordinate display without any requirement for computational interfacing cartesian-polar coordinate signal translating circuitry.

The above and other objects of the present invention are realized in a specific, illustrative ball tracker employing a ball secured for rotation on a subframe which, in turn, can rotate within a fixed housing. Two sensors are included on the rotating subframe, and mechanically coupled to the median circumference of the ball at positions spaced 90° apart. Further, the sensor-ball couplings for the two sensors are oriented to respond to ball rotations about orthogonal axes. The output of one sensor (e.g., a potentiometer) electronically embodies the radius (range) polar system parameter, and the output of the other sensor (e.g., a synchro) represents the angle (azimuth) polar coordinate.

The subframe is mechanically coupled, as by mechanical gears, to a driving motor and to a subframe angle sensor both of which are fixed to the stationary ball tracker housing. The outputs of the polar azimuth sensor and the subframe angle sensor, and the driving motor are connected in a servomechanism loop to position the rotatable subframe with the coupling for the range potentiometer aligned with the angle specified by the azimuth signal. The azimuth synchro-ball coupling is therefore disposed 90° from the range potentiometer coupling.

The above ball tracker apparatus is readily adapted to control a polar coordinate environment, e.g., a polar CRT cursor position. To quickly change the cursor display angle relative to a reference center point on the face of a cathode ray tube, one simply rotates the ball in the desired direction of cursor rotation normal to the existing cursor position. This changes the cursor angle (and also the orientation of the subframe by feedback action) without changing its range (length). Next, the operator rotates the ball in a direction corresponding to the angle of the cursor to change the cursor length without effecting any change in the display angle.

Figure 2:
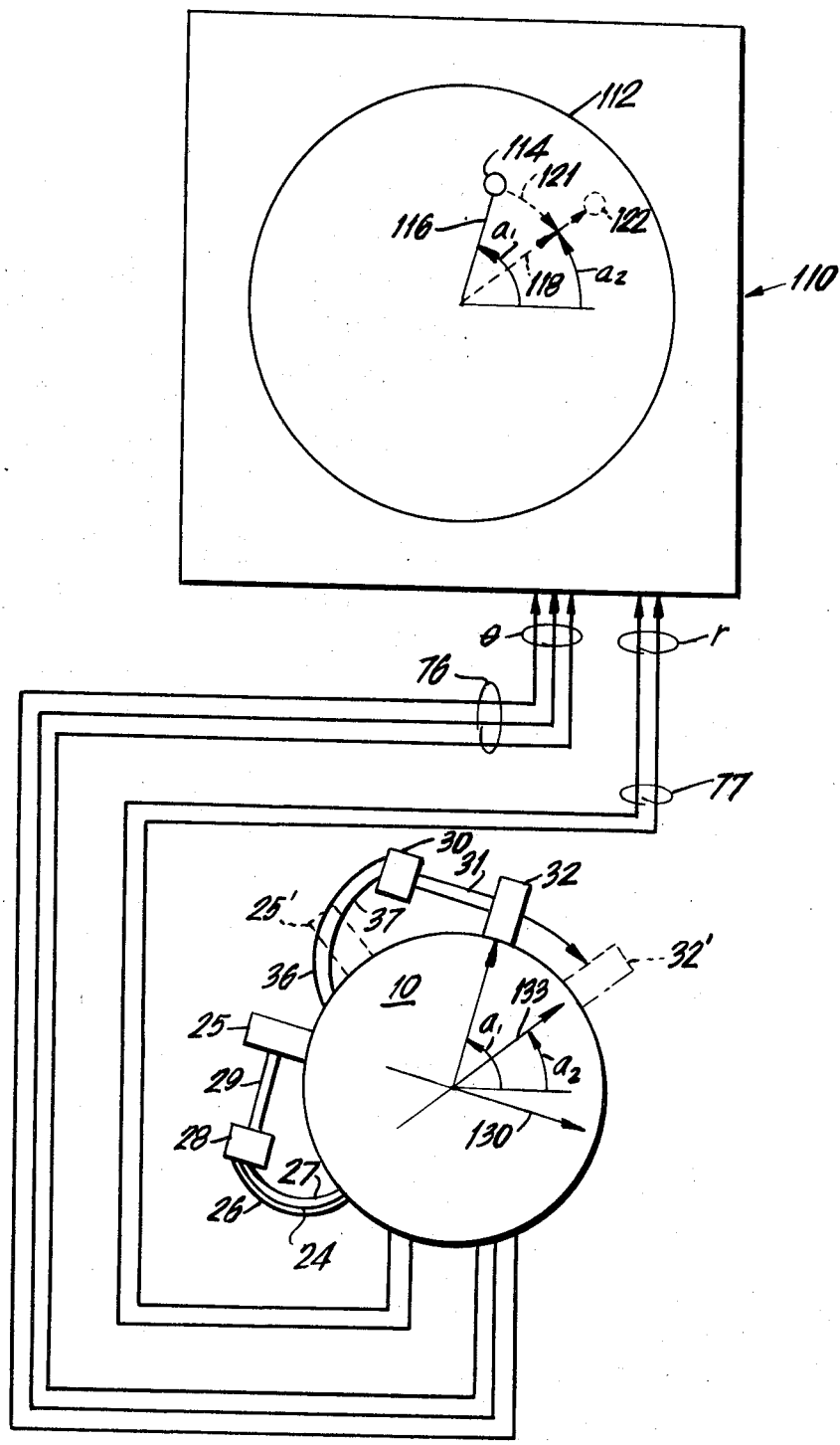

The above and other features and advantages of the present invention are realized in a specific, illustrative embodiment thereof, discussed hereinbelow in conjunction with the accompanying drawing, in which:

FIG. 1 comprises a schematic side view of ball tracker apparatus embodying the principles of the present invention; and FIG. 2 schematically depicts ball tracker apparatus employed in conjunction with a cathode-ray tube polar display.

Referring now to FIG. 1, there is shown a ball tracker comprising a ball 10, e.g., formed of hard rubber, secured for rotation within a subframe 20. A portion (less than half) of the ball 10 protrudes above the top of frame 20, and is retained in place, as by a ring 14 and the periphery about a circular aperture atop the subframe 20. The ball is supported below by a member 45 having a truncated spherical socket in its top portion to receive the ball 10. Further, an additional retainer ring 43 may be employed in conjunction with the member 45. To facilitate ball rotation, the subframe surfaces engaging the ball may be coated, lined, or formed of a self-lubricating material such as polytetrafluoroethylene.

The subframe 20 and its appurtenant apparatus is mounted for rotation within a fixed housing 40, as by a plurality of rollers 22 which translate within a track 41 of housing 40. The subframe 20 is further affixed for rotation to the fixed reference housing 40 by an antifriction bearing 46 connected to the ball support member 45.

Two wheels 25 and 32 frictionally engage the ball 10 about its median periphery. The wheels are spaced 90° apart, and are oriented to respond to ball 10 rotation about orthogonal axes. More specifically, the wheel 25 will turn (and the wheel 32 will not) responsive to ball rotation in the direction 102 shown in FIG. 1. Correspondingly, only the wheel 32 turns responsive to ball rotation in the direction 100.

The wheel 25 is coupled by a shaft 29 to a sensor 28 which provides an electrical output which depends upon the rotational position of the shaft 29. The sensor 28 will be treated as a transmitting synchro herein, although other electrical shaft encoders will be readily apparent to those skilled in the art. The synchro 28 is affixed to the subframe 20 and frictionally urges the wheel 25 against the periphery of the ball 10. An alternating current potential is supplied to the synchro 28 from a source 67 thereof by way of brushes 74 and 75, slip rings 55 and 58, and leads 81 and 82. The electrical output signals from the synchro 28 are connected by three conductors 24, 26 and 27 to three slip rings 49, 50 and 51. The electrical output of the synchro 28, manifested by alternating voltages of varying amplitude, comprises one of the requisite two polar coordinate signals, for concreteness considered hereinbelow as the azimuth ($\theta$) signal.

Similarly the wheel 32 is coupled by a shaft 31 (FIG. 2) to a shaft angle responsive sensor 30, e.g., a variable resistance potentiometer, which provides the second requisite electrical output to form the radius ($r$) coordinate axis parameter. The output of the potentiometer 30 is connected to two sliprings 52 and 53 by way of two conductors 36 and 37.

A motor 64 is attached to the fixed housing 40 and coupled to the subframe 20 by a shaft 59 and engaged gears 57 and 55 for selectively rotating the subframe. Similarly, a sensor 62, e.g., a receiving synchro, is attached to the fixed reference 40 and is driven by the subframe 20 via gears 55 and 56, and a shaft 60. The output 63 of the sensor 62 comprises a synchro angular electrical representation of the spatial orientation of the subframe 20.

The sensor 62 and the motor 64 are connected in a closed feedback (servomechanism) circuit to orient the rotatable subframe 20 in a direction specified by the $\theta$ output of the synchro 28. In particular, the servo loop positions the subframe 20 such that the wheel 32 is disposed in the azimuth from center specified by the output of the synchro 28, when the composite ball tracker is viewed from above. In operation of the servo loop, known per se, the signal from sensor 28 is fed to sensor 62 via leads 24, 26 and 27 and sliprings 49–51 to introduce an error signal at the output of the sensor 62. The error signal is amplified by an amplifier 68 and applied to the motor 64 in a polarity to drive the motor for rotating the subframe in a direction to obviate any detected positional error in accordance with conventional feedback principles. The subframe rotates the shaft of the sensor 62 until its output is nulled.

Electrical signals on the sliprings 49–53 are coupled from the rotating subframe 20 via conducting elements 69–73 frictionally contacting the rings, e.g., carbon brushes. Three output leads 76 connected to slip rings 49–51 convey the angle ($\theta$) parameter to an output utilization circuit, and leads 77 connected to the slip rings 52–53 convey the range ($r$) data.

A typical application for the FIG. 1 ball tracker is schematically shown in FIG. 2, viz, to control a polar coordinate display 112 of a composite sonar or radar system 110. The ball tracker outputs on the leads 76 determine the angle of a cursor (pointer) 116 on the face of a polar coordinate display, as on the face of a cathode-ray tube. The system 110 includes circuitry for responding to input signals for effecting such a display in accordance with principles long known.

Let the cursor 116 initially point to (i.e., terminate on) a "target" signal 114 on the CRT face. The $\theta$ and $r$ signals on leads 76 and 77 supply information identifying the position of the target, as to a navigation system computer for avoidance if the return is a physical hazard, or to a fire control computer if the return is a hostile vehicle in a military situation.

The cursor 116 is shown as initially (i.e., at an angle $a_1$ with the horizontal. Accordingly, when this display obtains as discussed hereinabove, the wheel 32 is oriented as shown in the top view of the ball tracker in FIG. 2, i.e., as also making an angle $a_1$ with the horizontal.

Assume now that it is desired to change the cursor 116 to terminate on the target return 122 to identify the spatial position of the return 122 to a tracking computer. The signal 122 may comprise a second target, or the signal 114 which has shifted position. An operator first rolls the ball 10 in a direction 130 normal to the cursor orientation in the direction of the desired cursor rotation—the preferred direction from an operator conceptual standpoint.

Accordingly, the rolling ball 10 makes line contact with, and rotates the wheel 25 and shaft 29 to change the electrical output of the synchro 28. The ball 10 only makes point contact with the wheel 32 which thus does not turn. The varying output of the synchro 28 causes the pointer 116 to rotate clockwise toward the desired new angle $a_2$ with respect to horizontal. Since the potentiometer 30 is not varied, the cursor 116 retains essentially its original length during rotation, and follows the dashed path 121 to attain the new position 118. During rotation, minor correction(s) may be made to exactly position the cursor in the $a_2$ direction, these corrections always being made in a conceptually preferred direction normal to the instantaneous cursor position in the desired gradient direction.

The charging output of the $\theta$ synchro 28 also actuates the servo apparatus which rotates the tracker subframe 20 clockwise, such that the $r$ axis wheel 32 attains the dashed position 32' at an angle $a_2$ with respect to horizontal.

The ball 10 is then rotated in the direction 133, i.e., in the direction $a_2$ to extend the pointer to the desired length 120 touching the target. The rotation is again conceptually preferred since it is the natural action for an operator's eye-hand reflex system for the situation. When the ball is rotated in direction 133, the $\theta$ wheel 25 is disposed in the dashed position 25' normal thereto and is therefore not changed, i.e., range correction is a natural action which does not give rise to an azimuth miscorrection.

Thus, the composite ball tracker has been shown by the above to provide $r$ and $\theta$ output signals for polar coordinate system applications wherein the $r$ and $\theta$ signals may be independently varied in a rapid, efficient manner which is readily conceptually assimilated by an operator.

The above-described ball tracker is merely illustrative of the principles of the present invention. Numerous modifications and adaptations thereof will be readily apparent to those skilled in the art without departing from the spirit and scope of the present invention. For example, a vertical stick may be affixed to the top of the ball 10 to effect a "joy stick" tracker construction. Further, the above-described principles are applicable for any coupling system between an operator-actuated input and motion-responsive output signal producing sensors. Then also, the ball tracker of FIG. 1 may be employed in a cartesian coordinate system by fixing the rotatable housing 20 in a proper orientation relative to the outer housing 40, viz, with the wheels 32 and 25 disposed along conceptual 0° and 90° axes.

What is claimed is:

1. Tracker apparatus of the type having a fixed tracker housing, mechanical means adapted for motion by an operator, two sensors each responsive to a different motion of the mechanical means and each providing an output signal, wherein the improvement comprises:

a subframe rotatably mounted within said housing and having said two sensors mechanically coupled thereto for rotation therewith; and feedback means for rotating said subframe and said sensors in a direction determined by the output signal of one of said sensors.

2. Tracker apparatus as in claim 1 wherein said mechanical means includes a ball mounted for rotation and secured on said subframe.

3. Tracker apparatus as in claim 2 wherein each of said sensors includes a wheel engaging said ball periphery, and means connected to each of said wheels for providing different output signals depending upon the rotational position of said wheels.

4. Tracker apparatus as in claim 3 wherein said wheels of said sensors are spaced 90° apart about said ball periphery.

5. Tracker apparatus as in claim 4 further comprising signal receiving means, means including sliprings for coupling signals from said sensors on said subframe to said signal receiving means.

6. Tracker apparatus as in claim 5 wherein said feedback means includes a position sensor and a motor each secured to said fixed housing, and mechanical coupling means connecting said rotating subframe with said position sensor and said motor.

7. Tracker apparatus as in claim 1 wherein feedback means includes a position sensor and a motor each secured to said fixed housing, and mechanical coupling means connecting said rotatable subframe with said position sensor and said motor.

8. Tracker assembly as in claim 7 wherein said fixed housing includes a track, and wherein said subframe includes roller means for translating within said track.

\* \* \* \* \*

UNITED STATES PATENT OFFICE
CERTIFICATE OF CORRECTION

Patent No. 3,643,148   Dated February 15, 1972

Inventor(s) Arthur Brown, et al

It is certified that error appears in the above-identified patent and that said Letters Patent are hereby corrected as shown below:

Column 2, line 66, "14" should read -- 15 --. Column 4, line 7, "(i.e.," should read -- disposed --.

Signed and sealed this 31st day of October 1972.

(SEAL)
Attest:

EDWARD M. FLETCHER, JR.
Attesting Officer

ROBERT GOTTSCHALK
Commissioner of Patents